United States Patent [19]

Bauerkemper

Best Available Copy

[11] E Re. 30,848

[45] Reissued Jan. 19, 1982

[54] HAND TOOL FOR JOINING OBJECTS

[75] Inventor: Michael Bauerkemper, Cerritos, Calif.

[73] Assignee: Thomas & Betts Corporation, Raritan, N.J.

[21] Appl. No.: 48,134

[22] Filed: Jun. 13, 1979

Related U.S. Patent Documents

Reissue of:

[64] Patent No.: 4,070,754
Issued: Jan. 31, 1978
Appl. No.: 735,008
Filed: Oct. 22, 1976

[51] Int. Cl.[3] ..... H01R 43/04

[52] U.S. Cl. ..... 29/749; 29/268; 29/751; 29/758; 81/363; 81/373

[58] Field of Search ..... 29/566.4, 566.3, 747, 29/749, 750, 751, 758, 268; 81/362, 363, 355, 373, 375

[56] References Cited

U.S. PATENT DOCUMENTS

| | | | |
|---|---|---|---|
| 3,837,211 | 9/1974 | Gress et al. | 29/751 X |
| 4,005,516 | 2/1977 | Bakermans | 29/749 |

FOREIGN PATENT DOCUMENTS

| | | |
|---|---|---|
| 7050/27 | 4/1927 | Australia . |
| 7050/27 | 4/1927 | Australia . |
| 9583 | 2/1928 | Australia . |
| 16495 | 6/1929 | Australia . |
| 115349 | 7/1942 | Australia . |

*Primary Examiner*—Carl E. Hall
*Attorney, Agent, or Firm*—Robert M. Rodrick; Jesse Woldman

[57] ABSTRACT

A hand tool for assembling two or more articles along an extended plane. Arcuate motion of a movable handle is converted to axial movement of a presser plate to assemble the articles placed on an aligned platen. The movable handle controls a drive bar which is coupled to the tool frame by pivotally movable links which move the drive bar in two orthogonal directions and to the presser plate [to move it in two orthogonal directions] by means of pivotally movable links coupled to the drive bar. The [movements along one orthogonal axis cancel one another and the movements along the other orthogonal axis are cumulative whereby the] presser plate is moved only in the direction of the platen.

20 Claims, 15 Drawing Figures

HAND TOOL FOR JOINING OBJECTS

Matter enclosed in heavy brackets [ ] appears in the original patent but forms no part of this reissue specification; matter printed in italics indicates the additions made by reissue.

BACKGROUND OF THE INVENTION

1. Field of the Invention

The invention applies to hand tools for assembling two or more articles along an extended plane and, more particularly, to a hand tool for assembling a multi-contact connector to a multi-conductor cable in one operation and applying a uniform compressive force.

2. Description of the Prior Art

Prior art tools for assembling a multi-contact connector (e.g., 50 to 60 contacts) to a multi-conductor cable (e.g., 50 to 60 conductors) fall into two categories; (1) cantilevered jaw hand tools, or (2) arbor type presses. The cantilevered jaw hand tools were scissor-like having a pair of extended parallel jaws extending from the handle pivot to the free ends of the jaws. The compressive force, which the jaws could apply to objects to be assembled, depended upon the location of any assembly point with respect to the pivot. If the center of the jaw length was to have the correct assembly force, then those points closer to the pivot received forces in excess of that desired while those points closer to the jaw free ends received insufficient forces. Also, because of the large forces required to make the assembly and the resistive forces of the connector and cable, the hand tool has to be able to withstand the resulting deflective forces. To do this, the tool parts had to be strong resulting in a large, heavy and bulky tool not readily usable.

The arbor type press also had to be strong enough to withstand the resistive forces and, accordingly, was large, heavy and bulky. Additionally, the press required a table, or other flat surface sufficiently strong to support the press and permit the desired assembly. All of these elements made field installation, or repairs, very difficult.

SUMMARY OF THE INVENTION

The present invention overcomes the difficulties noted above by providing a hand tool which is light in weight, easily held and used and able to assemble items with uniform installation forces while requiring that the operator expend a small amount of handle force. The tool converts the arcuately applied handle forces to axially applied compression forces via pivoting links. The movable handle of the tool operates a drive bar which is connected by pivotable links to the tool frame to move the drive bar in two orthogonal directions. The movable handle also drives the presser plate, coupled also to the drive bar, to move the presser plate [in two orthogonal directions. The movements provided in a plane perpendicular to the axis of closure of the presser plate are opposite in direction and cancel one another out and thereby eliminate any movement of the presser plate in such direction. The other movements provided are both along the axis of closure of the presser plate and in the same direction thus combining the two movements].

The tool has a top frame member and a lower frame member connected at both ends to eliminate the cantilevered action above described. A platen matched to the connector cable assembly is coupled to the bottom frame member and the presser bar is coupled to the upper frame member so that the axially applied force is applied equally along the entire connector length. The connection of the upper and lower frame members at one end is selectively disengaged to permit the platen to be changed when desired and to permit the tool and a connector to be applied in mid span of the cable run. It is an object of this invention to provide a novel hand tool.

It is another object of this invention to provide a novel tool for the assembly of two objects.

It is a further object of this invention to provide a novel compression tool capable of applying a uniform compression force along the entire length of the tool's compression area.

It is still a further object of this invention to provide a novel compression tool wherein arcuate movement of the handle member is translated into axial movement of a presser plate.

It is yet another object of this invention to provide a novel compression tool wherein arcuate movement of the handle member is translated into axial movement of a presser plate through pivotal links.

It is still another object of this invention to provide a novel compression tool wherein the platen may be changed to match the objects to be compressed.

It is yet another object of this invention to provide a novel compression tool wherein one end member may be selectively opened to permit easy interchange of the platens and to permit midspan connection to a through cable.

Other objects and features of the invention will be pointed out in the accompanying drawings, which disclose by way of example, the principles of the invention, and the best mode which has been contemplated for carrying them out.

BRIEF DESCRIPTION OF THE DRAWINGS

In the drawings in which similar elements are given similar reference characters.

DESCRIPTION OF THE PREFERRED EMBODIMENTS

Figure 1:
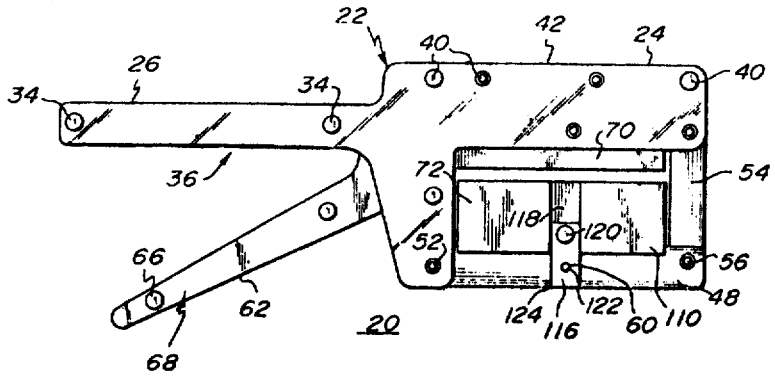
FIG. 1 is a left side elevation of a tool constructed in accordance with the concepts of the invention.
Figure 2:
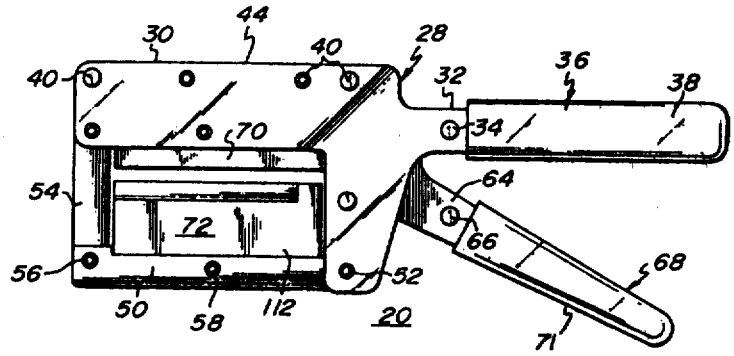
FIG. 2 is a right side elevation of the tool of FIG. 1.
Figure 3:
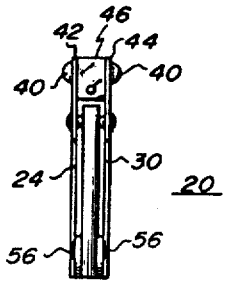
FIG. 3 is a front elevation of the tool of FIG. 1 with the platen and presser plate removed.

Turning now to FIGS. 1, 2 and 3, a tool 20 constructed in accordance with the concepts of the invention is shown. A left face plate 22 (see FIG. 1) has a frame portion 24 and a fixed handle portion 26. Right face plate 28 (see FIG. 2) similarly has a frame portion 30 and a fixed handle portion 32. The fixed handle portions 26, 32 are fastened together by fasteners such as 34 spaced along their lengths. Fixed handle portions 26, 32 are spaced apart by spacers (not shown) to form a unitary fixed handle 36, and may have a grip 38 placed thereover to make handling and use of tool 20 easier. The frame portions 24, 30 are also fastened to one another by fasteners 40 and held in spaced apart relationship adjacent the top edges 42, 44, respectively, thereof, by spacers (not shown) and a nose piece 46 (see FIG. 3). A left insert 48 (see FIG. 1) and a right insert 50 (see FIG. 2) are assembled to one another with a spacer 49 (see FIG. 4) therebetween and to the heel of left frame portion 24 and the heel of right frame portion 30 by the pivot pin 52. A latch bar 54 is placed between inserts 48, 50 and the bar 54 and inserts 48, 50 are joined by pivot pin 56 (see FIG. 3). The latch bar 54, as will be described in more detail below, is free to pivot about pivot pin 56. Pin 58 also holds inserts 48, 50 and the spacer 49 together. In addition, pin 58, adjacent insert 48 is contoured to a conical shape to act as the platen retaining pin 60 to be described in greater detail below.

Figure 11:
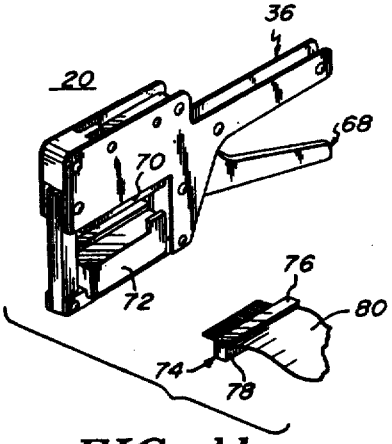
FIG. 11 is a right front prospective view of the tool of FIG. 1 showing the positioning of the tool parts preparatory to receiving a connector partially assembled to a flat cable.
Figure 12:
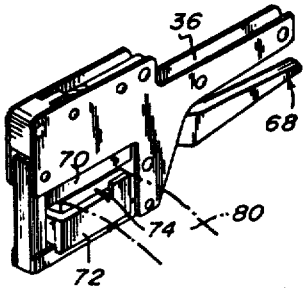
FIG. 12 is a right front prospective view of the tool of FIG. 11 in operation to assemble the connector to the flat cable.

Left movable handle member 62 (see FIG. 1) is assembled to right movable handle member 64 (see FIG. 2) by means of fasteners 66 and held in spaced apart relationship by spacers (not shown) to form a unitary handle 68 which may also have thereon a grip 71. Movable handle 68 is pivoted adjacent one end, as will be described below, and is permitted to move arcuately towards and away from fixed handle 36. The position of movable handle 68 shown in FIGS. 1 and 2 is the initial or static position. A presser plate 70 is coupled to movable handle 68 and is caused to be moved axially toward and away from inserts 48, 50 as will be described below. A platen 72 is positioned on inserts 48, 50. As shown in FIG. 11, a connector 74 having a top portion 76 and a bottom portion 78 loosely coupled together with a flat cable 80 placed therebetween is placed in tool 20 so that the bottom portion 78 rests on platen 72. The movable handle 68 is then operated towards fixed handle 36 causing the presser plate 70 to move axially towards platen 72 and cause the connector 74 to close and its contacts (not shown) to engage the conductors of the flat cable 80 as is shown in FIG. 12.

Figure 6:
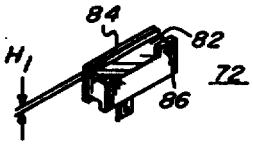
FIG. 6 is a right front prospective view of the platen of the tool of FIG. 1.
Figure 7:
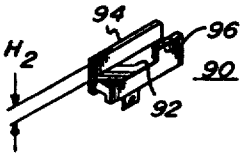
FIG. 7 is a right front prospective view of a further platen for use with the tool of FIG. 1.
Figure 8:
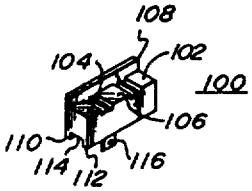
FIG. 8 is a right front prospective view of still a further platen for use with the tool of FIG. 1.

The platen 72 of FIGS. 1 and 2 is better shown in FIG. 6. The platen 72 is formed so that proper support can be given to a connector to be joined to a cable. Thus, in FIG. 6, platen 72 has a horizontal surface 82 upon which a connector base portion can be placed. Two upstanding retaining walls 84, 86 extending upwardly from surface 82 support the connector against lateral movement out of contact with the platen 72. The retaining wall 84 extends the length of platen 72 but retaining wall 86 is shorter to provide access to the connector for the flat cable 80 to be assembled to the connector 74 as is shown in FIGS. 11 and 12. The platen can be modified as required to match any desired connector, cable or connector-cable arrangement. In FIG. 7, the platen 90 has a horizontal surface 92 with upstanding retaining walls 94, 96 between which the connector is placed. As with platen 72 the wall 94 extends the length of the platen 90 while wall 96 is a partial wall. Platen 90 is arranged to work with a connector of greater height than was platen 72. As a result, to be able to handle a taller connector, the surface 92 is positioned further below the top surface of wall 94, as shown by the distance identified as $H_2$ in FIG. 7, than surface 82 is below the top surface of wall 84 as shown by the distance identified as $H_1$ in FIG. 6. Platen 100 as shown in FIG. 8 is another form which is intended to assemble a cable to a connector having exposed contacts extending from its bottom surface. Horizontal surface 102 is provided with a number of slots 104 to receive the extending contacts while the lands 106 between the slots 104 support the connector. A single upstanding retaining wall 108 is provided. Although three different platen arrangements are shown, it should be understood that any shaped platen can be used consistent with the tool size and connector-cable arrangement.

Figure 10:
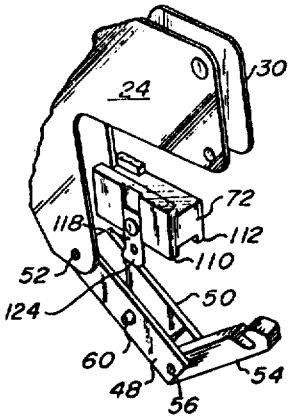
FIG. 10 is a fragmentary left front prospective view of the tool of FIG. 1 with the tool in an open condition and indicating the manner of installation of a platen on the tool.

To hold the platen in place, each of the platens are fitted with further retaining walls 110, 112 which provide therebetween a recess 114 as is shown in FIG. 8. The base of recess 114 is arranged to be supported by the tops of inserts 48, 50 and the spacer therebetween. The wall 110 extends along the outer surface of insert 48 (see FIG. 1) while wall 112 extends along the outer surface of insert 50 (see FIG. 2). A flexible platen retaining member 116 is fixed within a recess 118 (see FIG. 1) in one side of the platen 100 which extends into retaining wall 110 of FIG. 8. The member 116 is fixed to the platen 72 by fastener 120 and has an aperture 122 therein to receive the platen retaining pin 60 and thus retain the platen 72 on the inserts 48, 50. The member 116 is contoured such that free end 124 (see FIG. 10) can be deflected by the operator's finger or by contact with pin 60 as the platen 72 is installed or removed. FIG. 10 shows the latch bar 54 disengaged with the inserts 48, 50 rotated about pivot pin 52 to facilitate the placement and engagement of the platen 72 with the tool 20.

Figure 9:
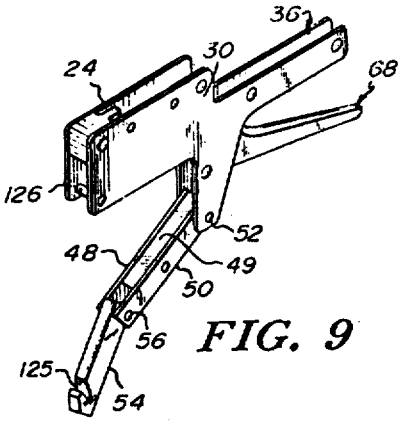
FIG. 9 is a right prospective view of the tool of FIG. 1 with the platen removed and the tool in an open condition.
Figure 13:
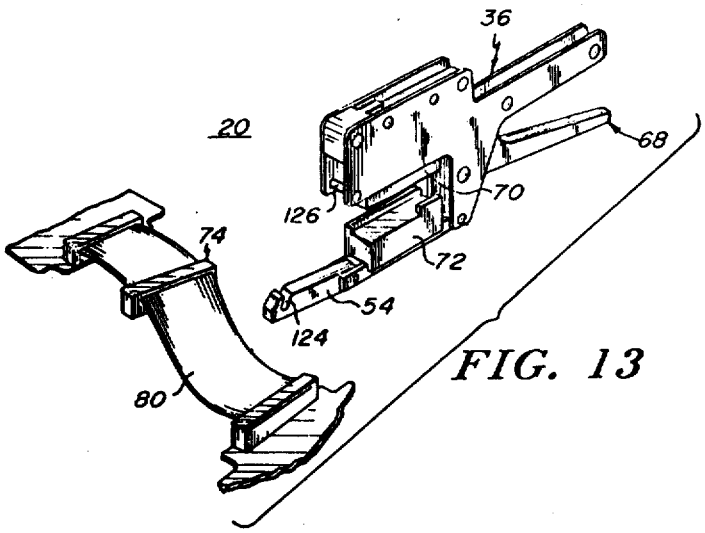
FIG. 13 is a right front prospective view of the tool of FIG. 1 in an open condition for receipt of a connector and flat cable to terminate the cable midspan.

The latch bar 54, has a slot 125 adjacent its free end (see FIG. 9) and is arranged to receive pin 126 therein. Latch bar 54 is urged by compression spring 128 (see FIG. 4) between end 51 of spacer 49 and the tapered portion 53 of latch bar 54 in a counterclockwise direction assuring engagement of pin 126 by slot 125. Thus, when it is required to insert or remove a platen such as 72, the latch bar 54 is rotated away from the pin 126 to disengage slot 125 from pin 126 and permit the inserts 48, 50 and latch bar 54 to rotate exposing the upper surfaces of inserts 48, 50 and spacer 49 as is shown in FIG. 9. This ability to rotate the entire platen area away from the tool face plates 22, 28 also permits the tool 20 to be used for midspan joints. In the FIGS. 11 and 12, a connector 74 was coupled to the very end of flat cable 80. To use a tool limited to such types of joints would mean that once terminated the flat cable could not be tapped unless all previous connectors were removed and the tap connector and tool passed along the entire cable length from one end to the tap location or the flat cable would have to be cut thus interrupting service on the cable, and each cable end coupled to connectors and the connectors jumpered. In the instant invention, tool 20 can be opened as above set forth with respect to FIGS. 4 and 9 and a connector 74 and a flat cable 80 entered into the platen 72 area through the location normally occupied by latch bar 54 as shown in FIG. 13.

Figure 4:
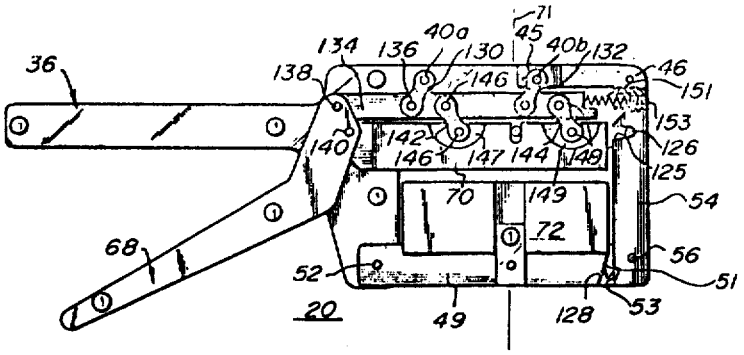
FIG. 4 is a left side elevational, partially in section, of the tool, as in FIG. 1 with a face plate removed and fragmented to show the interval details thereof.
Figure 5:
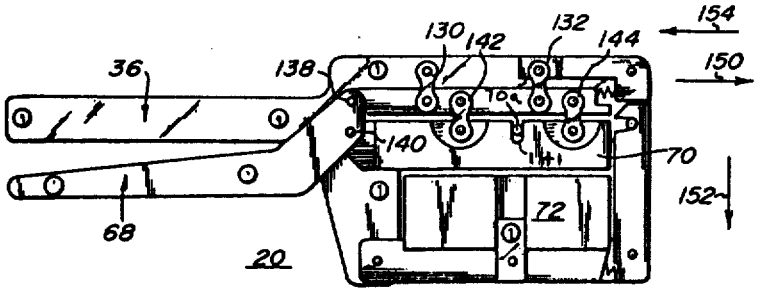
FIG. 5 is a left side elevational view similar to FIG. 4 showing the tool details in the condition at the completion of an operation.

Turning now to FIGS. 4 and 5, the manner of operation of the tool 20 will be set forth. Two pairs of links 130, 132, are coupled at one end by the fasteners 40a, 40b that hold the face plates 22, 28 together. Only one of each pair of links 130, 132 is visible in each of the FIGS. 4 and 5. The actual arrangement for the pair of links 130 is face plate 22, link 130, a spacer, the second link 130 and the face plate 28. Links 132 are arranged similarly except that a reduced width portion 45 of nose piece 46 takes the place of the spacers. The opposite ends of links 130, 132 are connected to a drive bar 134 by means of pivot pins 136. Drive bar 134 is connected by means of pivot pin 138 to the movable handle 68. In addition, a pivot pin 140 connects movable handle 68 to presser plate 70. Links 142, 144 are coupled by pivot pins 146, 148 respectively to drive bar 134. In addition, the links 142, 144 are coupled to presser plate 70 by pivot pins 146, 148. The effect of this arrangement of links is to convert the arcuate motion of the movable handle 68 towards the fixed handle 36 into axial movement along axis 71, of presser plate 70 towards platen 72 using the pivotal movement of links 130, 132, 142, 144.

As the movable handle 68 is moved to fixed handle 36, the drive bar 134 undergoes two movements. Considering pivot pin 140 to be fixed, merely for an understanding of the tool 20 operation the drive bar 134 is moved in the direction of arrow 150 and at the same time is moved downwardly in the direction of arrow 152. These movements are caused by the straightening of the links 130, 132 to the positions shown in FIG. 5 which places the drive bar 134 to the right and below the position it occupied as shown in FIG. 4. [Now assuming that pivot pin 138 is fixed, the pivot pin 140 causes the presser plate 70 to move to the left in the direction of arrow 154 and downwardly in the direction of arrow 152. The net effect of the rightward movement (in direction of arrow 150) of drive bar 134 and the leftward movement (in direction of arrow 154) is to retain the presser plate 70 in its desired horizontal position.] *In the course of movement of drive bar 134, links 142 and 144 are caused to assume dispositions also shown in FIG. 5, presser plate 70 being constrained against movement in directions 150 and 154 by a guide comprised of pin 141 and presser plate slot 70a. Presser plate 70 is accordingly driven downwardly in the direction of arrow 152.* Since the movement of drive bar 134 and presser plate 70 are both downward (in direction of arrow 152) they are cumulative and together provide the movement of presser plate 70 necessary to assemble the connector and cable. Although for the purposes of the description, the pivots 138 and 140 have been assumed alternately fixed, the actual pivot point is phantom point at a location different from both. It is merely the connection of links 130, 132 to the face plates 22, 28 by pins 40a and 40b that keeps the movable handle 68 in the tool 20.

To decrease the size of the tool 20 the links 142, 144 are coupled to presser plate 70 within recesses 147, 149. The initial position of the drive bar 134 is set by a compression spring 151 coupled to drive bar 134 at one end and to nose piece 46 on the other. The initial position of compression spring 151 is set by an adjustable stop 153 in the face of nose piece 46. As drive bar 134 moves to the left in the direction of arrow 154 (see FIG. 5), pivot pin 138 causes movable handle 36 to move to its open position as in FIG. 4 and pivot pin 140 causes presser plate 70 to move to the right in the direction of arrow 150. The pivoting of the links 130, 132, 142, 144 raises the presser plate 70 to its original position and the tool 20 is available for a further termination.

Figure 14:
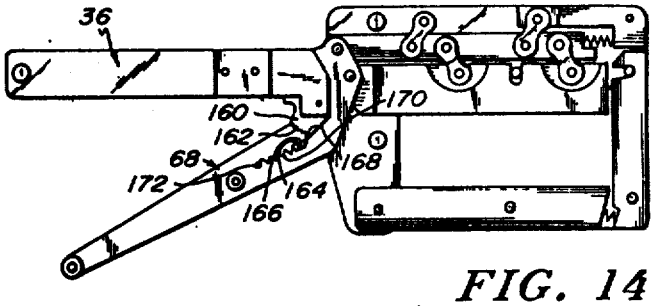
FIG. 14 is a right side elevation, with face plate removed, showing a modified tool constructed according to the concepts of the invention.
Figure 15:
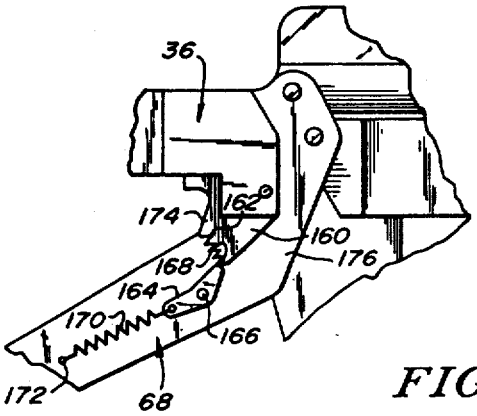
FIG. 15 is a fragmentary side elevation, greatly enlarged showing the full stroke compelling mechanism of the tool of FIG. 14.

In order to assure that the proper connection between a connector and cable is made and to avoid the possibility that an operator may open the tool 20 before a proper connection is made a device known as a full stroke compelling mechanism is employed. This mechanism is engaged when more than a minimum travel of movable handle 68 towards fixed handle 36 has taken place. Once the mechanism is engaged, it is only possible to open the tool 20 after a specified travel of movable handle 68 has taken place. This assures a good connection each time. Turning to FIGS. 14 and 15, a full stroke compelling mechanism is shown. Coupled to fixed handle 36 is a plate 160 with a number of recesses 162 thereon. A pawl 164 is mounted to movable handle 68 by a pivot pin 166. The pawl 164 has a nose portion 168 arranged to engage the recesses 162. The pawl 164 is coupled by tension spring 170 to a fixed pin 172 mounted on movable handle 68. Once nose 168 of pawl 164 engages the first recess 162 pawl 164 cannot be disengaged from plate 160 until the rear clearance area 174 of plate 160 is reached at which time spring 170 will rotate pawl 164 counterclockwise about pivot pin 166 disengaging the nose 168 from the recesses 162 and allowing the pawl 164 to pass over the recesses without engagement as the movable handle 68 is moved to the open position.

If it is desired to use this tool as a cutting tool, presser plate 70 could take the form of a cutting blade and platen 72 be used as an anvil, or both presser plate 70 and platen 72 could both take the form of blades.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

I claim:

1. A hand tool for joining two or more objects together comprising: a frame member having a first end portion, a second end portion and an intermediate portion therebetween; a movable support member having first and second ends, said first end pivotally coupled to said intermediate portion of said frame member to permit movement of said support member second end with respect to said frame member second end portion; a latch bar pivotally coupled to said second end of said support member and releasably coupled to said frame member second end portion to prevent relative movement of said support member with respect to said frame member; handle means having first and second ends, [said second end of said handle means pivotally coupled to said intermediate portion of said frame member;] presser plate means; first coupling means coupled to said presser plate means and said frame member between said intermediate portion and said second end portion; and second coupling means coupling said presser plate *means* to said second end of said handle means; the arcuate movement of said first end of said handle means towards said first end portion of said frame member driving said presser plate *means* axially towards said support member.

2. A tool as defined in claim 1, wherein said first coupling means comprises pivotally mounted links.

3. A tool as defined in claim 1, wherein said first coupling means comprises a plurality of pivotally mounted link pairs.

4. A tool as defined in claim 1, wherein said first coupling means comprises a drive bar and pivotally mounted links.

5. A tool as defined in claim 1, wherein said first coupling means comprising a drive bar and a plurality of pivotally mounted links.

6. A tool as defined in claim 1, wherein said first coupling means comprises a drive bar and first links each having a first end and a second end, said first ends of each of said first links pivotally mounted to said frame member and said second ends of each of said first links pivotally mounted to said drive bar.

7. A tool as defined in claim 1, wherein said first coupling means comprises a drive bar *and a presser plate*; first links each having a first end and a second end, said first ends of each of said first links pivotally mounted to said frame member and said second ends of each of said first links pivotally mounted to said drive bar; and second links each having a third end and a fourth end, said third ends of each of said second links pivotally mounted to said drive bar and each of said fourth ends of said second links pivotally mounted to said presser plate.

8. A tool as defined in claim 1 wherein *said presser plate means comprises a presser plate;* said second coupling means comprises a pivoted connection between said second end of said handle means and said presser plate.

9. A tool as defined in claim 1, wherein said first coupling means comprises a drive bar *and a presser plate* and first links each having a first and a second end, said first ends of each of said first links pivotally mounted to said frame member and said second ends of each first links pivotally mounted to said drive bar; and said second coupling means comprising a pivotal connection between said second end of said handle means and said presser plate.

10. A tool as defined in claim 1, wherein said first coupling means comprises a drive bar *and a presser plate*; first links having first and second ends, said first ends of each of said first links pivotally mounted to said frame member and said second ends of each of said first links pivotally mounted to said drive bar; second links each having a third and a fourth end, said third ends of each of said second links pivotally mounted to said drive bar and each of said fourth ends of said second links pivotally mounted to said presser plate; and said second coupling means comprising a pivotal connection between said second end of said handle means and said presser plate.

11. A tool as defined in claim 1, further comprising a platen selectively installable to said support member, said platen configured to accept and support the objects to be joined.

12. A tool as defined in claim 1, further comprising a resilient member urging said latch bar into a locking condition with said second end portion of said frame member.

13. A hand tool for joining two or more objects together comprising: a frame member having a first end portion, a second end portion and an intermediate portion therebetween; a support member having first and second ends, said first end coupled to said intermediate portion and said second end coupled to said second end portion; handle means having first and second ends [said second end of said handle means pivotally coupled to said intermediate portion of said frame member]; *a* presser plate [means]; first coupling means coupled to said presser plate means and said frame member between said intermediate portion and said second end portion; said first coupling means comprising a drive bar; first links having first and second ends, said first ends of each of said first links pivotally mounted to said frame member and said second ends of each of said first links pivotally mounted to said drive bar; second links each having a third and a fourth end, said third ends of each of said second links pivotally mounted to said drive bar and each of said fourth ends of said second links pivotally mounted to said presser plate; and second coupling means coupling said presser plate to said second end of said handle means; said second coupling means comprising a pivotal connection between said second end of said handle means and said presser plate and a pivotal connection between said second end of said handle means and said drive bar; the arcuate movement of said first end of said handle means towards said first end portion of said frame member driving said presser plate axially towards said support member.

[14. A tool as defined in claim 13, wherein the arcuate movement of said first end of said handle means towards said first end portion of said frame member tending to drive said presser plate in a first direction and said drive bar in an opposite direction.]

[15. A tool as defined in claim 13, wherein the arcuate movement of said first end of said handle means towards said first end portion of said frame member tending to drive said presser plate in a first direction and said drive bar in an opposite direction, the movements of said presser plate and said drive bar being substantially equal in magnitude and cancelling any movement of said presser plate in a plane perpendicular to the axis of movement of the presser plate towards the support member.]

[16. A tool as defined in claim 13, wherein the arcuate movement of said first end of said handle means towards said first end portion of said frame member tending to drive said presser plate in a first direction along the axis of movement of the presser plate towards the support member and along an axis perpendicular to said axis of movement and said drive bar in said first direction and along an axis perpendicular to said axis of movement and opposite in direction to the movement of said presser plate; the movements of said presser plate and said drive bar being substantially equal in magnitude cancelling any movement of said presser plate in a plane perpendicular to the axis of movement of the presser plate towards the support member; and the movements of said presser plate and said drive bar being in the same direction along said axis, said presser plate is moved a distance equal to the total movement along said axis of said presser plate and said drive bar.]

*17. A tool for joining objects together, comprising:*

*(a) a frame member having a first end portion, a second end portion and an intermediate portion therebetween;*

*(b) drive bar means for receiving actuating force applied to said tool at said frame member first end portion;*

*(c) first coupling means for interconnecting said drive bar means to said frame member intermediate portion and for displacing said drive bar means along first and second mutually orthogonal axes upon such application of actuating force to said drive bar means;*

*(d) compression means in said frame member for controlling the position of said drive bar means;*

*(e) presser plate means for engaging said objects;*

*(f) guide means for constraining movement of said presser plate means to movement along said first axis; and*

*(g) second coupling means for interconnecting said presser plate means to said drive bar means for imparting such first axis movement to said presser plate means in the course of such displacement of said drive bar means along said first and second axes.*

*18. The tool as defined in claim 17 including means for adjusting said compression means to provide for variation in such positioning of said drive bar means.*

*19. The tool as defined in claim 17 wherein said drive bar means comprises drive bar having first and second ends, said drive bar defining at said first end a pivotal connection for such actuating force receipt, said compression means comprising a spring member disposed between said drive bar second end and said frame member second end portion.*

*20. The tool as defined in claim 19 wherein said first coupling means comprises links pivotally connected to said frame member intermediate portion and to said drive bar and wherein said second coupling means comprises links pivotally connected to said drive bar and said presser plate means.*

*21. The tool as defined in claim 20 wherein said links of said first coupling means and said links of said second coupling means have respective different attitudes with respect to said first axis in the absence of application of actuating force to said drive bar means.*

*22. The tool as defined in claim 17 further including a support member having first and second ends, said first end pivotally coupled to said intermediate portion of said frame member and said second end releasably coupled to said second end portion of said frame member, and platen means supported by said support member for engaging said objects.*

*23. The tool as defined in claim 22 wherein said platen means is releasably secured to said support member.*

* * * * *